Patented July 10, 1945

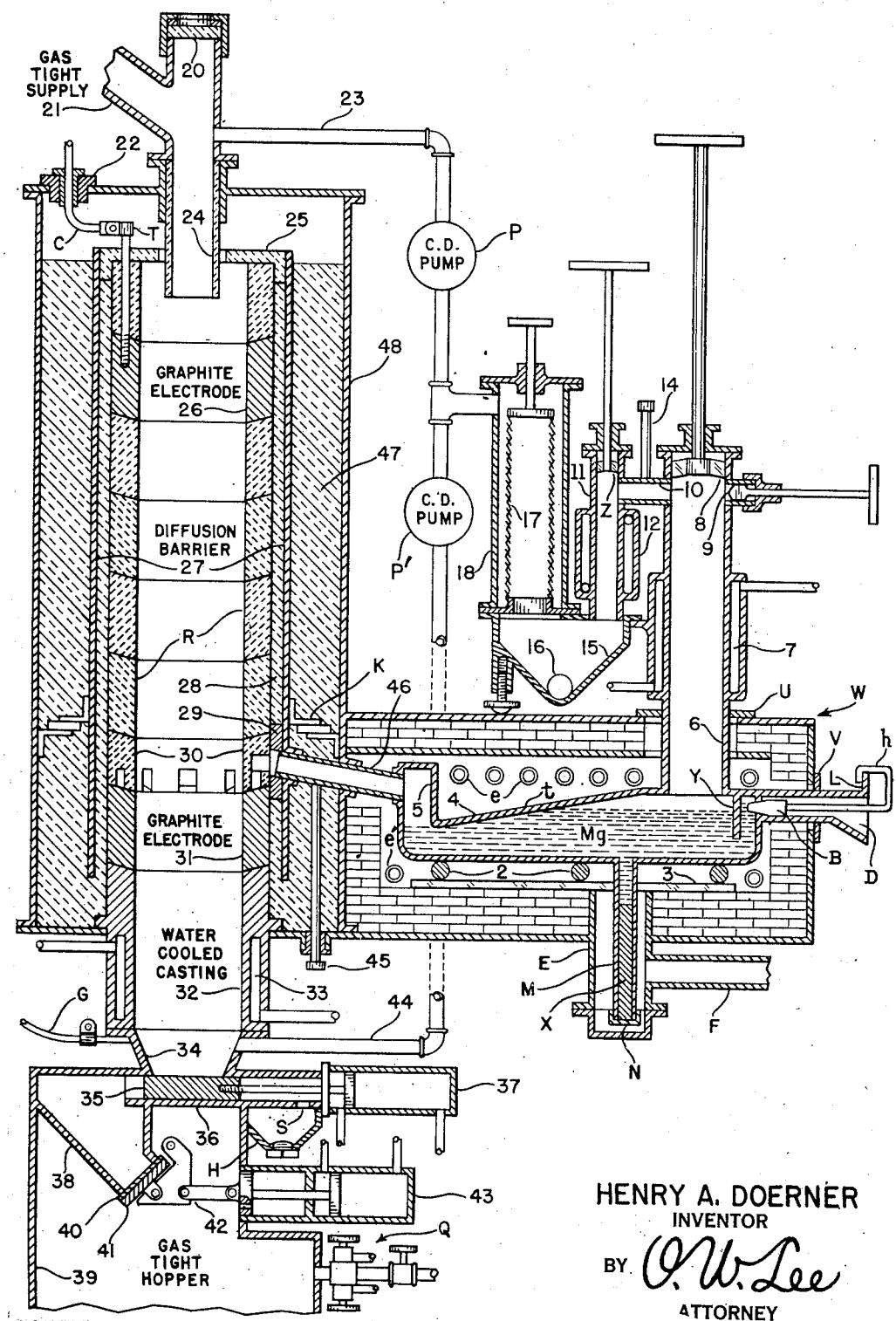

2,379,888

UNITED STATES PATENT OFFICE 2,379,888

MAGNESIUM DISTILLATION FURNACE

Henry A. Doerner, Pullman, Wash.

Application August 29, 1944, Serial No. 551,747

10 Claims. (Cl. 13—8)

The present invention relates to certain new and useful improvements in a magnesium distillation furnace of that type wherein the charge of material is used as an electrical resistance to afford the heat for vaporization of the magnesium metal.

That mode of distilling magnesium metal has been proposed in various patents issued during the past twenty-five years, and it has been successfully put into practice in large scale distillation of zinc, and can be successfully used for some other metals. However, it has never been found possible to successfully utilize that same mode in the large scale distillation of magnesium.

It is quite generally well recognized that such a mode would be highly desirable in large scale distilling of magnesium, and that it would afford speed and also effect great economy in the amount of space and equipment otherwise required, and also afford economy in the electric power consumption.

Skilled engineers in the magnesium industry have diligently sought for some mode of continuous distillation of magnesium metal wherein a moving charge of the material can be used as an electrical resistance to afford the required heat for vaporization. The general principles are well known to all, but it has been found impossible to successfully utilize them in the distillation of magnesium. The principal difficulty arises from the fact that it is almost impossible to produce a refractory wall sufficiently non-porous to retain magnesium vapors. Great difficulty arises from the fact that the magnesium vapors escape through the refractory wall and then condense as metal, which causes short circuits and renders the equipment inoperatable. The temperature required for efficient vaporization of magnesium is quite likely to cause spalls or cracks in the refractory walls, and this of course allows the magnesium vapor to escape and condense so as to cause short circuits and thus defeat the entire purpose.

The difficulties are so great that the electrothermic production of magnesium has necessarily been confined to batch lot distillation by external heat under reduced pressure and at a low temperature, which requires about 72 hours for each batch, and also necessitates remelting because condensation as a liquid is impossible by that process.

My previous Patent No. 2,328,202, issued August 31, 1943, described a mode of continuous distillation by external heat, and that proved successful in pilot plant operation, but has certain limits of capacity. Due to the limited rate at which external heat can be transferred through the wall of the furnace and into the charge of material which is a rather poor conductor of heat, such externally heated distillation furnaces must be limited in size, otherwise it will become impossible to supply the heat at sufficient rate to afford the rather high heat of vaporization required for magnesium, which is 2,460 B. t. u. per pound. Multiplicity of such furnaces could be resorted to, but the present invention eliminates that need and enables large scale production to be accomplished by continuous distillation in a single furnace.

According to the present invention, the distillation furnace can be of any suitable size and proportions, and the charge of material is gravitated through the furnace which is provided with suitably spaced electrodes so that the charge of material forms an electrical resistance between the electrodes, and a suitable gas is circulated through the furnace to carry the magnesium vapors to a condenser. That much of the equipment is acknowledged to be well known, and the present invention is particularly directed to surrounding the refractory walls of the distillation furnace with a diffusion barrier spaced sufficiently near the refractory walls to assure that the temperature of the diffusion barrier will be above the dew point of the magnesium vapor in the gas, when the temperature of the refractory walls approximates the boiling point of magnesium metal.

This diffusion barrier is impervious to magnesium vapor and confines any vapors which unavoidably escape through the refractory walls, and, due to the aforesaid temperature relation, the vapors can not condense and cause short circuits. Thus the present invention eliminates the difficulties which rendered prior art furnaces of the same general type inoperatable and useless. This diffusion barrier is preferably of sheet steel and if exposed to air it would oxidize rapidly at the required temperature of operation, for which reason it is enclosed in an airtight casing and thermally insulated to maintain the required operating temperature.

The accompanying drawing illustrates one example of the physical embodiment of my invention.

For the convenience of illustration the refractory walls are shown as hollow cylinders such as R stacked one on top of the others to form the shaft of the furnace which also includes a hollow cylindrical electrode 2% near the top and a similar electrode 31 near the bottom. A vapor outlet ring 30 is provided above the bottom electrode, and this bottom electrode 31 seats on a hollow cylindrical casting 32 of the same size and which is provided with a water jacket as shown at 33. This furnace shaft is enclosed by an airtight casing 48 through the top of which the feed pipe 21 extends into the furnace shaft. This feed pipe 21 connects to a supply source of the magnesium material to be distilled, and that supply source is not here shown, as it is no part of the present invention. To preclude overflow of the furnace shaft, this feed pipe 21 extends down into the furnace, for which reason the feed pipe is provided with an inner extension 24 which is of non-metallic material so as not to be an electrical conductor. This prevents short circuits between the furnace charge and the feed pipe 21 which unavoidably is grounded to the power source at G. The top electrode 26 has a terminal T connected to a conductor C which passes through the insulator 22 and connects to the power source.

The metallic diffusion barrier 27 surrounds the furnace shaft and is in closely spaced relation therewith, usually about 2 inches away. This diffusion barrier is supported from the walls of the outer casing 48 by a suitable number of brackets in the manner indicated at K where a brick is shown interposed between the corresponding brackets so as to thermally insulate them.

A vapor tube 46 extends from the interior of the diffusion barrier 27 to the exterior of the enclosing casing 48 and has a gastight union with each of them. This vapor tube is located at the height of the vapor ring 30 but is not connected thereto, as it is intended that the vapor tube should also draw from the interior of the diffusion barrier as well as from the vapor ring. The drawing shows a bored block 29 surrounding the end of the vapor tube where it extends into the diffusion barrier, but this block has a loose fit and is only for the purpose of guarding the vapor tube against entrance of fragments of the thermal insulation 28 which is here shown as packed between the diffusion barrier and the furnace shaft. This thermal insulation can be omitted, in which case the block 29 is also omitted, but the top of the diffusion barrier is closed by a non-metallic ring 25 which serves as an electrical insulator, but is primarily intended to preclude gas circulation from entering between the top of the diffusion barrier and the furnace shaft. An inert gas such as hydrogen, is supplied under pressure through the pipes 23 and 44 which enter the top and bottom of the furnace shaft and afford a two-directional circulation which passes out the vapor tube 46. It is essentially necessary that the charge of material in the furnace shaft offer the path of least resistance to the flow of gas, and for this reason the top of the diffusion barrier should either be closed or else the space inside the diffusion barrier should be filled with thermal insulation; either one or the other will suffice, and the closure ring 25 can be omitted when this space is filled with thermal insulation, and vice versa. In either instance, the space between the outer casing 48 and the diffusion barrier 27 is filled with thermal insulation 47 so as to enable the diffusion barrier to be maintained at the required operating temperature.

The exhausted charge of material may be continuously removed from the bottom of the furnace shaft by any suitable lock discharge device. The invention is not limited to any particular form of lock discharge device, and the drawing shows by way of example, the hydraulically operated lock discharge device which I am now using on this type of distillation furnace which is in successful operation with the diffusion barrier. As here shown, an outlet cone 34 is attached to the bottom of the water cooled casting 32; and a boxing 36 is secured to this outlet cone 34. A block 35 is slidably mounted in this boxing and is reciprocated by the hydraulic ram 37 so as to alternately open and close the lower end of the outlet cone 34. A small lock chamber 38 is provided adjacent this boxing 36 so as to receive the discharge from each forward stroke of the block 35. This lock chamber is provided with a hinged closure 41 having a suitable gasket 40. A second hydraulic ram 43 is operatively connected to this hinged closure 41 by linkage as indicated at 42. This lock chamber 38 discharges into a gastight hopper 39 from which the exhausted charge may be removed in any suitable manner not here shown. The closure 41 is here shown in the closed position but in actual practice it remains open at all times except when the hopper 39 is being emptied, during which time the discharge is retained in this lock chamber 38 and therefore it should have sufficient capacity for that purpose. To provide escape for any refuse that may unavoidably sift in behind the block 35, the boxing 36 is slotted at S and a small hopper H is provided to collect this refuse so that it will not interfere with the reciprocation of the block 35.

The vapor discharge tube 46 may be connected to any suitable condenser unit and the present invention is not concerned with the details of the condenser, except that it should afford liquid condensation so as to avoid the waste of time and heat otherwise required for remelting. Merely for the sake of completeness of disclosure, the drawing shows a condenser unit which will adequately suffice for large scale production. As here shown, a closed tank 4 is mounted on rollers 2 which travel on tracks such as 3. As shown at t, the top of this tank slants downwardly towards one end where it is provided with an elevated vapor chamber 5 to which the vapor tube 46 is connected, so that the vapors must travel an appreciable distance through the molten magnesium which is here shown as filling the major portion of the tank. This provides for condensing most of the magnesium as a liquid, but as magnesium has considerable vapor pressure at slightly above the melting point, there is need for further condensation, for which reason there is attached to this tank, a vertical casing 6 which may be either gas or water cooled as indicated at 7, so as to condense the remaining magnesium as a solid. A cutting tool 8 is provided for removing the solid magnesium from the walls of this casing so that the cuttings drop back into the molten pool and are melted. This cutter is here shown as manually operated, but in actual practice it should be mechanically rotated and hydraulically reciprocated in any suitable manner.

Unavoidably, there is always some condensation as fine particles of magnesium which travel with the flow of hydrogen gas, and this passes out through the cross-tube 10 into a downwardly extending casing 11 which is water cooled as indicated at 12 so as to condense any remaining traces of magnesium as a fine dust and also to avoid heating the pumps P and P'. A scraper Z is provided to scrape this dust down into the hopper 15 which is connected to this casing 11, and a scraper 9 is also provided to clean the cross-tube 10. A bag filter 17 is mounted in a casing 18 on top of the hopper 15 to separate the magnesium dust from the hydrogen, which then passes out to the two pumps P and P' which return it under pressure through the pipes 23 and 44 to the top and bottom of the distillation furnace, in a continuous recirculation. Any magnesium dust that collects in the hopper 15 is either blown or else augered out at 19 into a vat of hydrocarbon oil (not shown) from which the metal is subsequently recovered by distillation. A thermcouple 14 is shown mounted on the cross-pipe 10 to sense the temperature at this point so as to avoid too abrupt cooling in the first casing 6 as that would produce an undesirable amount of fine dust condensation instead of a crystalline deposit which is more desirable because it can be constantly returned to the molten vat and melted, which is not feasible with a fine dust condensate. Various other modes of handling this fine dust condensate may be employed, so as to eliminate the need for the illustrated bag filter 17.

In large scale production, considerable heat is liberated by the condensing magnesium and this is absorbed by the molten vat of magnesium metal, which must necessarily be constantly cooled to dissipate this liberated heat. As here shown, this tank of molten magnesium is thermally insulated by brick and suitably encased as indicated at W, and loose cover-plates such as U and V are employed to accommodate the movements caused by heat expansion. Any suitable gas such as air is supplied through several entrance pipes such as e and discharged in any suitable manner. In the present instance there is shown an outlet pipe E which has a return pipe F in case a gas other than air is used and it is desired to return it for recirculation, or in case the exhaust air is utilized for heating purposes elsewhere; otherwise, the outlet pipe E may be open to atmosphere in any suitable manner.

The condensed magnesium may be tapped from the vat in any suitable manner. There is here shown a well Y which provides an air seal. The spout D connects with this well, and the spout is closed by a plunger B which has a bent handle h which engages a lug L on the upper part of the spout, so as to hold the plunger in closed position and readily removable when the molten magnesium is to be tapped. Tapping should be done at sufficiently frequent intervals to maintain a fairly constant level in the molten vat, so as to avoid too great a fluctuation of the pressure differential required to force the vapors through the molten mass. Where the production is of sufficient volume to afford a constant stream of sufficient size to prevent objectionable oxidation, the tapping may be by constant flow, so as to maintain a constant level in the molten mass.

For complete draining, the vat is provided with a drain pipe M which is disposed in the outlet pipe E so as to accommodate the movements caused by heat expansion. This drain pipe is here shown with a closure cap N, and at X the magnesium metal is shown solid in the lower part of the tube, for which reason the cap N may very well be omitted.

In actual practice the condenser tank 4 is provided with some suitable non-metallic lining such as graphite, but this expedient need not be here shown.

The distillation furnace is here shown as a single-phase type, and it will be understood that for large scale production, it is a simple matter to connect three such single-phase units in parallel, on a three-phase electrical power supply. If desired, the single-phase electrodes may be supplanted by three-phase electrodes in as many multiples as may be required.

The operation of the invention will be readily understood from the foregoing description. The charge of material to be fed into the distillation furnace, is obtained by any mode of electrothermal reduction of MgO and C, one form of which is disclosed in my aforesaid Patent No. 2,328,202 which employs shock cooling by vaporization of hydrocarbon oil; and there is also another well known mode which employs shock cooling by hydrogen or else by natural gas. In either mode, the magnesium unavoidably occurs in a finely divided state and intermingled with C and MgO from which it must be recovered by distillation. Various konwn practices may be employed to form this material into a suitable charge, which should be pressed into pellets or briquettes so as to minimize dusting. Hydrocarbons will dissociate at the operating temperature of the furnace shaft, and therefore the charge should be preheated sufficiently to drive off practically all of the hydrocarbons commonly used as a binder.

The distillation furnace shaft is filled with coke or else with exhausted discharge material, and the entire system is evacuated and filled with hydrogen or some other gas which is inert to magnesium. The required amount of electrical power is then supplied to the electrodes and the furnace operated on the dead charge for sufficient time to heat it up to the required operating temperature of about 1100° C. During this heating up period, the condenser tank is also heated in any suitable manner, as for instance combustible gas may be introduced through some of the pipes e and burned for this purpose. The tank 4 is then filled to the required level with molten magnesium, and the charge of material is supplied through the feed pipe 21; and the ram 37 is operated to continuously discharge the material from the furnace shaft. The rate of charging and discharging can be governed by inspecting the level of the charge which can be readily seen through the observation port shown at 20. When the hopper 39 becomes filled with the exhausted charge, it is a simple matter to close the cover 41 of the lock chamber 38 and then empty the hopper. It is advisable to first evacuate the hydrogen from the hopper and then fill it with air, before removing the exhausted charge. After the hopper is emptied, it should be evacuated to remove air and then filled with hydrogen before the cover 41 of the lock chamber is opened. The pipes and valves collectively shown at Q are provided for this purpose.

The operating temperature can be sensed by a thermocouple 45 contacting the vapor tube 46, and the power supply and rate of feed can be regulated accordingly. The temperature of the molten vat of magnesium may be sensed by a thermocouple (not shown) placed in any suitable location, and the supply of cooling gas through the tubes e can be controlled accordingly.

The pressure in the distillation furnace is maintained slightly above atmosphere pressure so that any leak will be a leak-out instead of a leak-in which would be dangerous because of the highly pyrophoric nature of magnesium vapors. Due to the fact that the distillation furnace can be operated at approximately the boiling point of magnesium, the distillation is fairly rapid; and moreover, the distillation is continuous, which affords a far greater efficiency than can be obtained by any form of batch distillation. Unlike the batch distillation now used in large scale production, the present invention enables the magnesium to be condensed as a liquid, and thus there is considerable saving of time and heat now expended in the remelting required by batch distillation, which is in reality a sublimation instead of distillation, and that inaptitude has long been quite generally recognized as a major problem in this industry.

Having thus described the nature and principle of my invention it will be seen that it is susceptible of wide variations of mechanical details without departing from the scope and spirit of the invention. As for instance, the refractory walls of the furnace may contain a percentage of graphite to render them electrically conductive a sufficient amount to serve as an electrical resistance, so that the walls can be heated directly by the power supply instead of by heat derived from the charge of material in the furnace. The percentage of graphite may vary from top to bottom of the furnace, so as to compensate for the progressive change in the resistance of the charge of material as it passes through the furnace. Such details are mere optional choices and not at all necessary, because successful operation can be obtained with refractory walls which have little or no electrical conductivity.

The refractory walls are here shown as hollow cylindrical rings which is but one form found satisfactory for the purpose; however, these walls may be built up with refractory bricks, and it matters not if there be crevices between the bricks, because the space between the diffusion barrier and the refractory walls can be filled with thermal insulation, and this is quite sufficient closure for any such crevices, particularly in view of the fact that there is always some seepage of magnesium vapor through the body of each brick, anyway. When the refractory walls are made as hollow cylinders having sufficiently low porosity and they are tightly joined, it is possible to omit the thermal insulation 28 shown inside the diffusion barrier 27, provided that the refractory walls will withstand the operating temperature for long periods without cracking or spalling. However, I prefer to fill the diffusion barrier with thermal insulation, as a safeguard should cracking or spalling occur, as that expedient enables successful operation to be continued long after numerous cracks or spalls have occurred. That insulation material minimizes the space which escaped vapors can occupy, and thus the quantity of magnesium vapors in the diffusion barrier is minor indeed, and therefore it is irrelevant whether those vapors are promptly removed or not, because they can not condense at the temperature at which the diffusion barrier is maintained, and therefore their presence is no disadvantage. However, there is a gradual flow of gas through the diffusion barrier and into the vapor tube 46 so that any vapors are gradually swept out of the diffusion barrier. At the end of a run, a short period of gas circulation while the furnace is still hot, effectually removes all vapors from the diffusion barrier so that there will be no condensation of metal when the furnace becomes cold, which would of course interfere with starting again.

The water cooled casting shown at 32 is merely an advisable expedient for reducing the temperature of the exhausted charge, before it is removed. This purpose could be accomplished by extending the refractory walls for some distance below the bottom electrode; however, the water cooled casting is a convenient mode of avoiding such extension.

The illustrated condenser may be varied in any desired manner, as such details are entirely optional in the present invention. In fact, solid condensation may be resorted to, although there is no occasion for that less desirable mode of condensing.

The invention is susceptible of various modes of automatic operation and control, such expedients being entirely optional. The discharge device and the lock chamber may be operated in various modes, either manually, mechanically, or hydraulically, or an entirely different form of discharge device may be employed, as such details are entirely optional in the present invention.

Various embodiments of the invention can be constructed within the scope of the distinguishing characteristics defined in the following claims.

I claim as my invention:

1. In a magnesium distillation furnace wherein a charge of material is used as an electrical resistance between electrodes spaced apart in the furnace, a diffusion barrier surrounding said furnace in closely spaced relation thereto and confining any magnesium vapors which escape through the walls of the furnace, a gas-tight casing enclosing said furnace and said diffusion barrier and thermally insulated from the latter, a condenser operatively connected with said diffusion barrier and means to circulate gas through said furnace and said condenser.

2. A magnesium distillation furnace comprising, a vertical shaft of refractory walls having electrodes spaced apart therein so that a charge of material in said shaft can form an electrical resistance between said electrodes, a diffusion barrier surrounding said refractory walls in closely spaced relation thereto, a gas-tight casing enclosing said refractory walls and said diffusion barrier, thermal insulation between said diffusion barrier and said casing, a closure for the top of said diffusion barrier, said furnace shaft having a vapor outlet into said diffusion barrier, a condenser, a vapor tube connecting said condenser to said diffusion barrier, means to circulate gas through said furnace shaft and said condenser, a gas-tight feed pipe for supplying material to the top of said furnace shaft, and a lock discharge device for removing exhausted material from the bottom of said furnace shaft.

3. A magnesium distillation furnace comprising, a vertical shaft of refractory walls having electrodes spaced apart therein so that a charge of material in said shaft can form an electrical resistance between said electrodes, a diffusion barrier surrounding said refractory walls in closely spaced relation thereto, a gas-tight casing enclosing said refractory walls and said diffusion barrier, thermal insulation inside and outside said diffusion barrier, said furnace shaft having a vapor outlet into said diffusion barrier, a condenser, a vapor tube connecting said condenser to said diffusion barrier, means to circulate gas through said furnace shaft and said condenser, a gas-tight feed pipe for supplying material to the top of said furnace shaft, and a lock discharge device for removing exhausted material from the bottom of said furnace shaft.

4. In a magnesium distillation furnace wherein the charge of material is used as an electrical resistance, a vertical shaft of refractory walls, electrodes spaced apart in said shaft, a diffusion barrier surrounding said refractory walls in closely spaced relation thereto, a casing enclosing said refractory walls and said diffusion barrier, thermal insulation between said diffusion barrier and said casing, a feed pipe for supplying material to the top of said furnace shaft, a discharge device for removing exhausted material from the bottom of said furnace shaft, a condenser operatively connected with said furnace shaft, and means to circulate gas through said furnace shaft and said condenser.

5. In a magnesium distillation furnace wherein the charge of material is used as an electrical resistance between electrodes spaced apart in a refractory shaft through which the charge of material is gravitated and including a condenser and means to circulate gas through the refractory shaft and condenser and including a gas-tight casing enclosing said refractory shaft, a metallic diffusion barrier surrounding said refractory shaft in closely spaced relation thereto, and thermal insulation inside and outside of said diffusion barrier.

6. In a magnesium distillation furnace wherein the charge of material is used as an electrical resistance between electrodes spaced apart in a refractory shaft through which the charge of material is gravitated and including a condenser and means to circulate gas through the refractory shaft and condenser, a metallic diffusion barrier surrounding said refractory shaft in closely spaced relation thereto, a gas-tight casing enclosing said refractory shaft and diffusion barrier, thermal insulation between said diffusion barrier and said enclosing casing, and a closure for said diffusion barrier.

7. In a magnesium distillation furnace wherein the charge of material is used as an electrical resistance between electrodes spaced apart in a refractory shaft, a metallic diffusion barrier surrounding said refractory shaft in closely spaced relation thereto, a gas-tight casing enclosing said refractory shaft and diffusion barrier and thermally insulated from the latter, and a condenser operatively connected with said refractory shaft.

8. In a magnesium distillation furnace wherein the charge of material is used as an electrical resistance between electrodes spaced apart in a refractory shaft, a diffusion barrier surrounding said refractory shaft in closely spaced relation thereto and confining any magnesium vapors which escape through the walls of said refractory shaft, a casing enclosing said refractory shaft and diffusion barrier and thermally insulated from the latter, and a condenser operatively connected with said refractory shaft.

9. In a magnesium distillation furnace wherein the charge of material is used as an electrical resistance, a vertical shaft of refractory walls, electrodes spaced apart in said shaft, a diffusion barrier surrounding said refractory walls in closely spaced relation thereto, a gas-tight casing enclosing said refractory walls and said diffusion barrier, thermal insulation inside and outside said diffusion barrier, said furnace shaft having a vapor outlet into said diffusion barrier, a condenser, a vapor tube connecting said condenser to said diffusion barrier, means to circulate gas through said furnace shaft and said condenser, a gas-tight feed pipe for supplying material to the top of said furnace shaft, and a lock discharge device for removing exhausted material from the bottom of said furnace shaft.

10. In a magnesium distillation furnace wherein the charge of material is used as an electrical resistance, a vertical shaft of refractory walls, electrodes spaced apart in said shaft, a diffusion barrier surrounding said refractory walls in closely spaced relation thereto, a gas-tight casing enclosing said refractory walls and said diffusion barrier, thermal insulation between said diffusion barrier and said casing, a closure for the top of said diffusion barrier, said furnace shaft having a vapor outlet into said diffusion barrier, a condenser, a vapor tube connecting said condenser to said diffusion barrier, means to circulate gas through said furnace shaft and said condenser, a gas-tight feed pipe for supplying material to the top of said furnace shaft, and a lock discharge device for removing exhausted material from the bottom of said furnace shaft.

HENRY A. DOERNER.